(12) United States Patent
Murphy et al.

(10) Patent No.: US 8,934,744 B2
(45) Date of Patent: Jan. 13, 2015

(54) OPTICAL DEVICES AND METHODS OF MANUFACTURE OF OPTICAL DEVICES

(75) Inventors: Dominic Finnian Murphy, Tullamore (IE); Noel Valentine Healy, Limerick (IE); Conleth Dennis Hussey, Limerick (IE); Ronan O'Byrne, Waterford (IE); Sergey Sergeyev, Kista (SE)

(73) Assignees: University of Limerick, Limerick (IE); Waterford Institute of Technology, Waterford (IE)

(*) Notice: Subject to any disclaimer, the term of this patent is extended or adjusted under 35 U.S.C. 154(b) by 359 days.

(21) Appl. No.: 13/499,782

(22) PCT Filed: Sep. 8, 2010

(86) PCT No.: PCT/EP2010/063151
§ 371 (c)(1),
(2), (4) Date: Apr. 2, 2012

(87) PCT Pub. No.: WO2011/042276
PCT Pub. Date: Apr. 14, 2011

(65) Prior Publication Data
US 2012/0207435 A1    Aug. 16, 2012

(30) Foreign Application Priority Data

Oct. 9, 2009  (IE) ................... S2009/0787

(51) Int. Cl.
| G02B 6/00 | (2006.01) |
| G02B 6/34 | (2006.01) |
| G02B 6/255 | (2006.01) |
| H01S 3/067 | (2006.01) |
| H01S 3/17 | (2006.01) |

(52) U.S. Cl.
CPC .......... *G02B 6/2552* (2013.01); *H01S 3/06745* (2013.01); *H01S 3/0675* (2013.01); *H01S 3/175* (2013.01)
USPC ................................ 385/43; 385/37

(58) Field of Classification Search
None
See application file for complete search history.

(56) References Cited

U.S. PATENT DOCUMENTS

| 6,507,693 B2* | 1/2003 | Maron et al. ................... 385/137 |
| 6,768,825 B2* | 7/2004 | Maron et al. ..................... 385/13 |
| 2003/0223693 A1* | 12/2003 | Tallent et al. .................... 385/39 |

OTHER PUBLICATIONS

Presby, H. M. et al., "Optical Fiber Up-Tapers with High Beam Expansion Ratios for Component Fabrication," 8217 IEEE Journal of Lightwave Technology, May 1989, vol. 7, No. 5, pp. 820-823, IEEE.
Wadsworth, W. J. et al., "Hole Inflation and Tapering of Stock Photonic Crystal Fibres," Optics Express OSA Sep. 5, 2005, vol. 13, No. 18, pp. 6541-6549, Optical Society of America.
International Search Report and Written Opinion for PCT/EP2010/063151, mailed Jan. 24, 2011.

* cited by examiner

*Primary Examiner* — Tina Wong
(74) *Attorney, Agent, or Firm* — Withrow & Terranova, P.L.L.C.

(57) ABSTRACT

A method for performing a multi-stage dilation of optical fibers is described, the method comprising performing successive dilation steps such that the adiabatic condition is maintained throughout the fiber. There is also described various optical devices employing such multi-stage dilated optical fibers, as well as methods of manufacture of the optical devices.

22 Claims, 3 Drawing Sheets

OPTICAL DEVICES AND METHODS OF MANUFACTURE OF OPTICAL DEVICES

This application is a 35 U.S.C. 371 national phase filing of PCT/EP2010/063151, filed Sep. 8, 2010, which claims priority to Irish national application number S2009/0787 filed Oct. 9, 2009, the disclosures of which are incorporated herein by reference in their entireties.

FIELD OF THE INVENTION

This invention relates to optical devices and methods of manufacture thereof, in particular single-mode optical fiber devices.

BACKGROUND OF THE INVENTION

Optical fibers that guide light by total internal reflection consist of a cylindrical core that has a higher refractive index than the surrounding cladding. For single-mode operation, the core size and the index difference between the core and cladding are such that only the fundamental mode is propagated for a given spectral bandwidth, as determined by the characteristic waveguide number or V-number. (A single mode fiber is an optical fiber that is designed for the transmission of a single ray or mode of light).

With reference to FIG. 1, an example of a single-mode optical fiber system is indicated at 10. The system 10 comprises a single-mode optical fiber 12 having an internal core 16 within external cladding 18. The core 16 and cladding 18 are protected within an external buffer 14, which is shown as being stripped along the length of the fiber that is to be processed. A cross-section of the fiber 12 across line A-A is indicated at 20. Typical dimensions for a standard telecommunications optical fiber 12 would be 9 µm diameter for the core 16 and 125 µm diameter for the cladding 18.

In the case of high-power transmission through standard single-mode fibers, end terminations of fibers and in-line splices or interconnects can introduce undesirable back-reflections and facet distortions that can lead to system damage and failure. Further complications can arise due to, e.g. dirt at the end termination and/or between the end of the fiber and an associated connector. In order to reduce this problem, it is desirable to reduce the power density by expanding the mode field diameter. This can be achieved using a variety of techniques, including fiber tapering, thermal core diffusion, lensing including bulk and grin lensing, fiber end shaping, and splicing on dissimilar fibers including e.g. multimode fibers. However, where a typical beam diameter of ~50 µm is desired, each of these solutions has associated problems.

In the case of tapering, the fiber becomes small, difficult to handle and more sensitive to external influences—making it difficult to package. The diffusion approach is limited in the extent to which the beam may be expanded before loss becomes significant. Lensing does not reduce the optical power density at the fiber end-face, generally involves the introduction of free-space facets, back-reflections, glues, alignment issues and loss within in-line fiber pigtailed bulk-optic sub-systems, and is expensive. Using dissimilar fibers requires a splice and introduces back-reflections and loss where the beam diameter is not mode-matched, and it can be a relatively expensive process compared with the approach described here.

An alternative technique which has been recently proposed is that of fiber fattening (also referred to as fiber up-tapering or fiber dilation), discussions of which may be found in [1] PhD thesis, Elaine M. O'Brien, Lightwave Technology Research Centre, University of Limerick; [2] "Up-tapering of optical fibers using a conventional flame tapering rig", G. Kakarantzas, L. Prill-Sempere and P. St. J. Russell, CFK2, Optical Society of America-CLEO/QELS Conference, 2007; and [3] "Adiabatic dialated standard and speciality optical fibers", N. Healy, D. F. Murphy, E. M. O'Brien and C. D. Hussey, Poster080 Photonics Ireland 2007 (Galway), which are incorporated herein by reference in their entireties.

In known fiber fattening processes, a fiber to be fattened is positioned between a pair of holders, and a heat source is applied along a length of the fiber to soften the core and cladding material. The heat source may be a conventional flame, or could comprise an arc, laser, or other heat source. The action of heating a fiber that is subjected to a compressive force above its glass transition temperature results in the expansion of the width of the fiber in conjunction with a reduction of the fiber length.

An example of the effects of up-tapering is shown in FIG. 2, which shows fiber 12 after up-tapering has taken place. As can be seen from FIG. 2, the length of the fiber 12 has decreased, the newly-fattened fiber 12a now showing transitions 22 between the end portions of the fiber 12a and the expanded middle portion 100 of the fiber 12a. An indication of the cross-section of the fiber 12a along line B-B is indicated at 24. Typical dimensions of the expanded cross-section after up-tapering would be 30 µm diameter for the core 16 and 375 µm diameter for the cladding 18.

Such up-tapered fibers provide for numerous advantages, e.g. the reduction of optical power density, the improvement of mode-matching between spliced dissimilar fibers, and the flattening of the wavelength response of fused directional fiber couples.

The up-tapering process is limited by a number of conditions which must be satisfied:

1. The adiabatic condition needs to be satisfied—i.e. the transition between the fattened and non-fattened sections needs to be sufficiently smooth to ensure the launch of only the local fundamental mode, so as to avoid any losses due to the transition. For the transitions to be adiabatic, at any point along the processed fiber, the transition must satisfy the slowness criterion:

$$\left|\frac{da}{dz}\right| \ll \frac{a}{z_b}$$

This is known as the adiabatic condition, wherein a is the core radius at any position z along the transition such that da/dz defines the taper angle and $z_b$ is the beat length or period of power oscillations between the excited modes of the system. The shortest beat length can be considered as that between the $HE_{11}$ mode (i.e. the designation for the fundamental mode of an optical fiber) and the closest mode of the same symmetry, the $HE_{12}$ mode. Transition losses due to non-compliance with the adiabatic condition are one of the more considerable limitations in fiber up-tapering.

2. A waveguide needs to be maintained. In conventional optical fibers, light is guided by total internal reflection, which is made possible by the index difference between the core and cladding. In general, the cladding used is silica, and the core has a raised index that is achieved by doping silica with germanium. The heating of the fiber during the fattening process results in thermal diffusion of the core dopant, germanium. With diffusion, the index difference between the cladding and core is reduced and the waveguide becomes weaker. Unless the diffusion is controlled, the diffusion may occur to such a degree that there will effectively no longer be an index step, and the optical fiber no longer acts as a waveguide. Further, any diffusion that does occur needs to satisfy the adiabatic condition given in 1. above.

3. Physical size mismatch. As a fiber is fattened, the fattened section becomes larger and heavier to the point that the standard fiber leads are no longer able to support its weight, and an inevitable sagging will take place.
4. Mode-area limit. Taking the example of large mode area fibers for lasing, as the mode area is increased, the fiber's ability to maintain single-mode only propagation is reduced, and light couples into the other modes of the fat, and accordingly highly multimode, structure. A number of techniques can be used to strip out higher mode behaviour and therefore maintain single-mode operation. This is a minimal concern in cases where the fattened fiber section is fattened over a short length.

Accordingly, current fiber fattening techniques are limited to the expansion that can be achieved, typically up to ~2.25 times dilation of the original fiber. It is an object of the invention to provide a new method of fiber fattening method that allows for greater dilation of fibers, while satisfying the limitations described above.

SUMMARY OF THE INVENTION

Accordingly, there is provided a fiber dilation method for providing a multi-stage dilated optical fiber, the method comprising the steps of:
performing a first-stage fiber dilation process on an optical fiber to form a first dilated section of the optical fiber; and
performing a second-stage fiber dilation process on said first dilated section of the optical fiber to form a second dilated section of the optical fiber, wherein said second dilated section is arranged such that the transition in diameter formed between said first dilated section and said second dilated section is spaced from the transition in diameter formed between the undilated section of the optical fiber and said first dilated section.

As the transitions between successive stages are spaced from one another, the adiabatic condition can be satisfied, and the transition losses kept within acceptable limits. The spacing is chosen to prevent significant transition losses between stages.

Preferably, said fiber fattening process comprises:
applying a heat source along a portion of the length of an optical fiber to soften said portion of the optical fiber; and
applying a compressive force to said portion of the optical fiber to dilate said portion.

Preferably, the method further comprises the steps of iteratively performing at least one successive fiber dilation process on the dilated section of a preceding stage, wherein the transition formed by said at least one successive fiber dilation process is spaced from the transition formed by the preceding stage.

As the transitions are spaced between successive stages, then significant transition losses between stages are prevented from occurring.

Preferably, the spacing is chosen such that the adiabatic condition is satisfied.

The adiabatic condition states that:

$$\left|\frac{da}{dz}\right| \ll \frac{a}{z_b}$$

wherein a is the core radius at any position z along the transition in diameter such that da/dz defines the taper angle and $z_b$ is the beat length between the $HE_{11}$ and $HE_{12}$ modes. $HE_{11}$ is the designation for the fundamental mode of the optical fiber, with $HE_{12}$ being the closest mode of the same symmetry.

Preferably, the spacing between successive transitions is 5 mm. This would be preferable for situations where a stationary oxy-butane flame is used as the heat source. In the case of a laser heat source being used, a smaller spacing may be preferred, due to the sharper thermal edges of the heat source. With a sophisticated tapering rig apparatus and moving a flame/laser heat source, the spacing between successive transitions could be reduced to a quasi-continuous transition or "zero-spacing", rather than a step transition.

Preferably, said first-stage fiber dilation process comprises dilating a section of said optical fiber to 2-3 times the diameter of said optical fiber, further preferably, 2.25 times the diameter.

Preferably, said second-stage fiber dilation process comprises dilating said first dilated section of the optical fiber to approximately 4-5 times the diameter of said original optical fiber, further preferably, 4.5 times the diameter.

There is further provided a multi-stage dilated optical fiber manufactured according to the above method.

The invention further provides for a method for the low-loss coupling of standard optical fibers with large mode area optical fibers, the method comprising the steps of:
manufacturing a multi-stage dilated optical fiber;
cleaving said multi-stage dilated optical fiber to provide a large mode area cleaved end; and
splicing said cleaved end of said multi-stage dilated optical fiber to a large mode area optical fiber.

In general, a standard fiber is multi-stage dilated up to the point of optimum mode area matching with a large mode area fiber, e.g. a high-power fiber laser type fiber. Then the multi-stage dilated standard type fiber is cleaved at the dilated section and spliced to the large mode area fiber to form a low-loss interface between the large mode area fiber and the standard fiber through the dilation of the standard fiber. In addition or alternatively, the large mode area fiber may be tapered down to match the dilated section of the standard fiber.

Preferably, said step of cleaving the multi-stage dilated optical fiber comprises cleaving the fiber across the widest cross-section of said fiber.

Preferably, the method comprises the step of selecting a large mode area optical fiber such that the diameter of the core of said large mode area optical fiber substantially corresponds to the diameter of the core of said cleaved end.

The invention further provides an optical fiber comprising a portion of standard optical fiber and a portion of large mode area optical fiber coupled according to the above method.

The invention further provides for a method of manufacture of an optical wavelength converter, the method comprising the steps of:
manufacturing a multi-stage dilated optical fiber;
cleaving said multi-stage dilated optical fiber to provide a first cleaved end of a multi-stage dilated optical fiber;

providing a large mode area doped optical fiber having a first end and a second end;

coupling the core of said cleaved end of a multi-stage dilated optical fiber with the first end of the core of said large mode area doped optical fiber, such that said cleaved end of a multi-stage dilated optical fiber and said large mode area doped optical fiber form an optical wavelength converter operable to convert optical signals of a first wavelength received at the uncleaved, undilated end of said multi-stage dilated optical fiber to optical signals of a second wavelength at said second end of said large mode area doped optical fiber.

Preferably, said step of cleaving the multi-stage dilated optical fiber comprises cleaving the fiber across the widest cross-section of said fiber Preferably, the method comprises the step of selecting a large mode area optical fiber such that the mode diameter of the core of said large mode area optical fiber substantially corresponds to the mode diameter of the core of said cleaved end.

The mode diameter/area is governed both by the physical dimensions of the fiber and by the index step between the core and the cladding. It is possible to have matched physical diameters but unmatched modes. To optimise the match between the modal areas, both the physical diameter and index step size should be considered.

The invention further provides an optical wavelength converter manufactured according to the above method.

The invention further provides for a method of manufacture of an optical fiber amplifier, the method comprising the steps of:

manufacturing a multi-stage dilated optical fiber;

cleaving said multi-stage dilated optical fiber to provide a first and a second section of a multi-stage dilated optical fiber having respective first and second cleaved ends and uncleaved ends;

providing a large mode area doped optical fiber having a first end and a second end;

coupling the core of said first and second cleaved ends of said multi-stage dilated optical fiber sections with the core of the respective first and second ends of said large mode area doped optical fiber to form an optical fiber amplifier, the amplifier operable to amplify an optical signal transmitted between said first and second uncleaved ends through said multi-stage dilated optical fiber sections and through said large mode area doped optical fiber.

Preferably, wherein said step of cleaving the multi-stage dilated optical fiber comprises cleaving the fiber across the widest cross-section of said fiber.

The invention further provides an optical fiber amplifier manufactured according to the above method.

The invention further provides for a method of manufacture of an optical fiber laser, the method comprising the steps of:

manufacturing a multi-stage dilated optical fiber;

cleaving said multi-stage dilated optical fiber to provide a first and a second section of a multi-stage dilated optical fiber having respective first and second cleaved ends and uncleaved ends;

processing said first and second cleaved ends to provide reflecting means at said cleaved ends;

providing a large mode area doped optical fiber having a first end and a second end;

coupling the core of said first and second cleaved ends of said multi-stage dilated optical fiber sections with the core of the respective first and second ends of said large mode area doped optical fiber such that a resonant lasing cavity is provided between said first and second cleaved ends to form an optical fiber laser.

For lasing to occur, a resonant gain cavity is required in the fiber. This cavity is excited by a pump source and resonance is achieved in the cavity, at the lasing wavelength, using reflectors at either end of the cavity. In a fiber system, the end reflectors are typically fiber Bragg gratings—the most convenient and effective and preferred method. However, further types of reflecting means may be employed, for example, it would be possible to "drill" into the fiber either side of the lasing cavity and deposit silver/gold to achieve end reflection.

Preferably, said step of cleaving the multi-stage dilated optical fiber comprises cleaving the fiber across the widest cross-section of said fiber.

Preferably, said step of processing comprises providing partial end reflectors in both cleaved ends. Preferably, said step of processing comprises inscribing a grating pattern at said cleaved ends. Preferably, said grating pattern comprises a fiber Bragg grating.

The invention further provides an optical fiber laser manufactured according to the above method.

Preferably, the fiber is selected from one of the following types of glass: phosphate, silica, telluride, fluoride, chalcogenide.

Preferably, the fiber is doped with a rare-earth material. Preferably, the fiber is doped with one of the following dopants: erbium, thulium, chromium, ytterbium, neodymium, praseodymium, terbium, or a combination thereof.

It will be understood that the general terms fattening, dilation, expansion and up-tapering are interchangeable, and are used to refer to the expansion of the diameter of an optical fiber as described by the invention.

BRIEF DESCRIPTION OF THE DRAWING FIGURES

Embodiments of the invention will now be described, by way of example only, with reference to the accompanying drawings, in which.

DETAILED DESCRIPTION OF THE INVENTION

Figure 1:
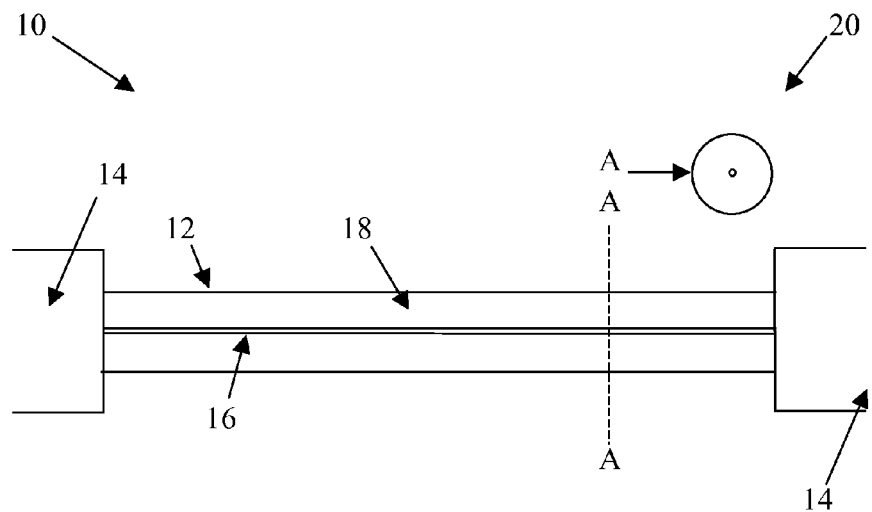
FIG. 1 is a view of a known optical fiber system.

The invention relates to a multi-stage fiber expansion process. For the first-stage fattening, a portion of optical fiber 12 stripped of its buffer 14 (as shown in FIG. 1) is held taut between a pair of vacuum chucks. A heat source, e.g. an oxy-butane flame burner, having a length shorter than that of the optical fiber 12 is applied along a portion of the length of the fiber 12, while a compressive force is applied to the fiber 12.

In general, the heat source may comprise a relatively long flame, the length of which corresponds to the length of that portion of the fiber it is desired to fatten. Alternatively, the heat source may comprise a relatively short flame which is swept back and forth along the length of that portion of the fiber 12.

Figure 2:
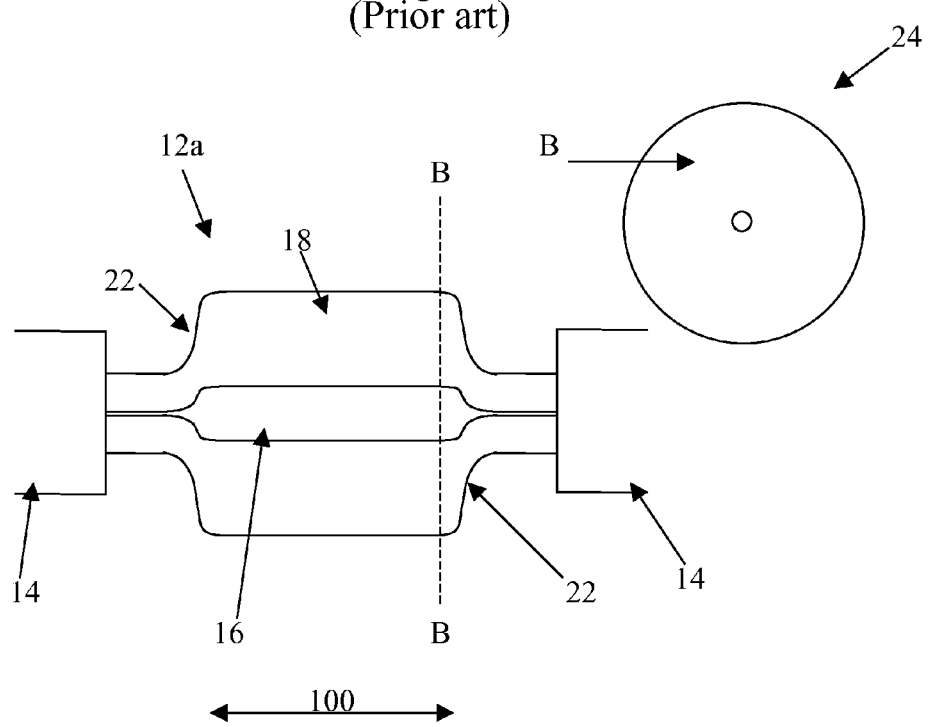
FIG. 2 is a view of the optical fiber of FIG. 1 after single-stage up-tapering has been performed.

As the heat source softens the material of the optical fiber, the compression acts to dilate or fatten the body of the fiber 12. This process is repeated until the limitations regarding fiber fattening or up-tapering, e.g. transition losses, start to become significant. In most optical fiber situations, this would approximate to the point where the middle portion of the original fiber 12 has expanded to roughly 2-3 times the original cross-sectional area, as indicated by the section 100 of the fattened fiber 12a of FIG. 2.

A second-stage fattening is now performed, wherein a heat source is applied along a portion of the expanded section 100 of the fattened fiber 12a. The heat source for the second stage fattening is applied along a shorter length of the fiber 12a than the heat source for the first stage, with the result that the second-stage fattening occurs away from the transitions 22 in optical fiber diameter caused as a result of the first-stage fattening. As with the first stage fattening, a compressive force is applied to the fiber 12a, resulting in the dilation of the heated portion of the fiber 12a. As with the first fattening stage, the second fattening stage can be performed until the limitations regarding fiber fattening or up-tapering start to become significant, or until the desired dilation is achieved.

Figure 3:
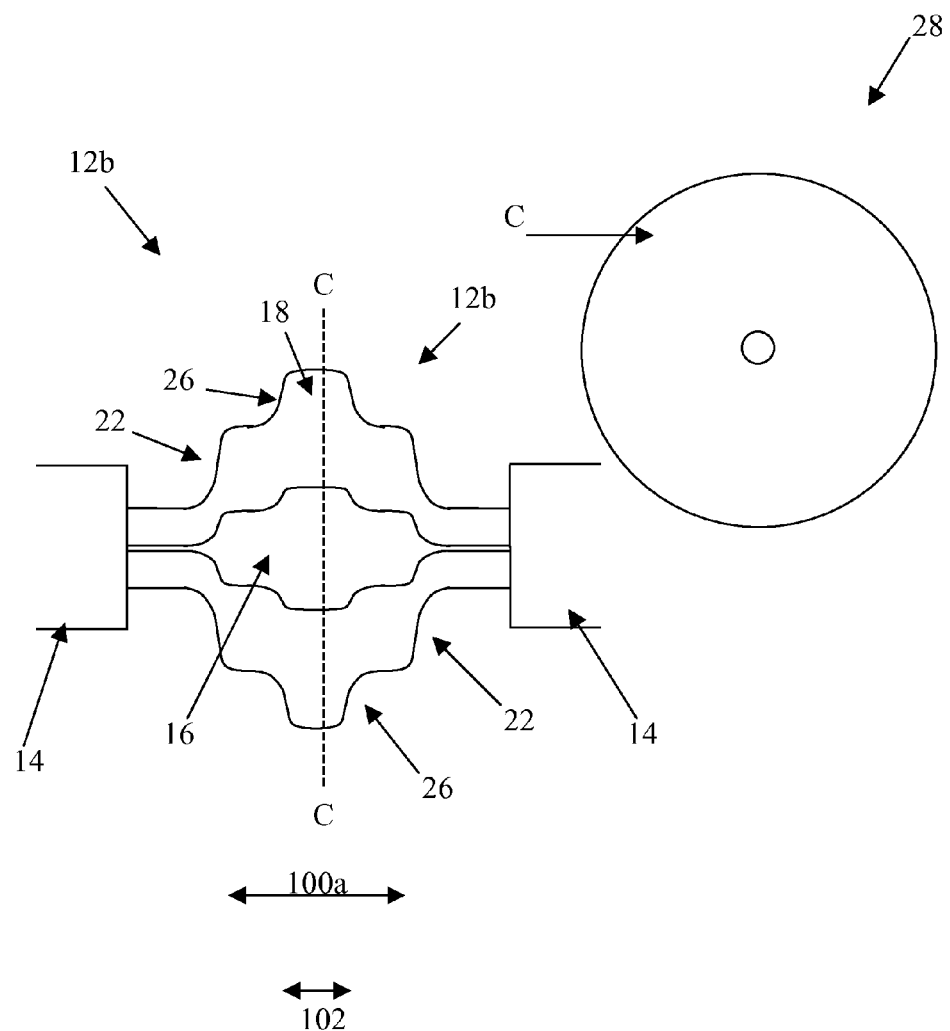
FIG. 3 is a view of the optical fiber of FIG. 1 after two-stage up-tapering has been performed according to the invention.

With reference to FIG. 3, a second-stage fattened optical fiber is shown at 12b. As a result of the second fattening stage, the expanded section 100 of the first-stage fattened fiber 12a has effectively shortened in length to section 100a, with a second expanded section 102 formed within the boundaries of section 100a having an increased diameter than that of the fattened section 100 of the first-stage fattened fiber 12a. As can be seen from FIG. 3, the transitions in diameter 26 between the first-stage fattened fiber 100a and the second-stage fattened fiber 102 are spaced from the transitions in diameter 22 between the original unfattened optical fiber 12 and the first-stage fattened fiber 100a. As the fattened sections 100a,102 are arranged such that a space is maintained between the transitions 22,26, this prevents the occurrence of transition losses at the boundaries due to the adiabatic condition being satisfied.

An indication of the cross-section of the second-stage fattened fiber 12b along line C-C is indicated at 28. Typical dimensions of the expanded cross-section after up-tapering would be 45 μm diameter for the core 16 and 560 μm diameter for the cladding 18.

Considering an example of a stripped, two-stage fattened fiber, the minimum initial strip length would be approximately 160 mm, and governed by:

A 5 mm clearance from the stripped buffers 14 at both ends of the processed fiber;

A centred first-stage fattened section length of 15 mm (to include the second-stage fattened section) up to a diameter of 280 microns; and A centred second-stage fattened section length of 5 mm up to a diameter of 560 microns.

It will be understood that further fattening stages may be performed as required, in order to further increase the diameter of a fattened fiber, provided that the conditions for fiber fattening are satisfied, e.g. the adiabatic condition. It is predicted that, given the conditions and limits for 2-stage fattening, a 3-stage fattening process may provide a 6-8 times increase in physical diameter from the original fiber size. Preferably, a minimum distance of approximately 5 mm is maintained between successive transition sections.

Up-tapered fibers can then be used in the construction of different fiber optic devices. For example, for an active device, such as an erbium-doped laser, the fattened section provides an interface between a standard fiber and a separate, large mode area, erbium-doped fiber section. For a fiber spectrometer, a cleaved fattened end-face may be processed, for example, by inscribing a pattern, or photo-inducing a pattern, on the end-face using a laser.

Figure 4:
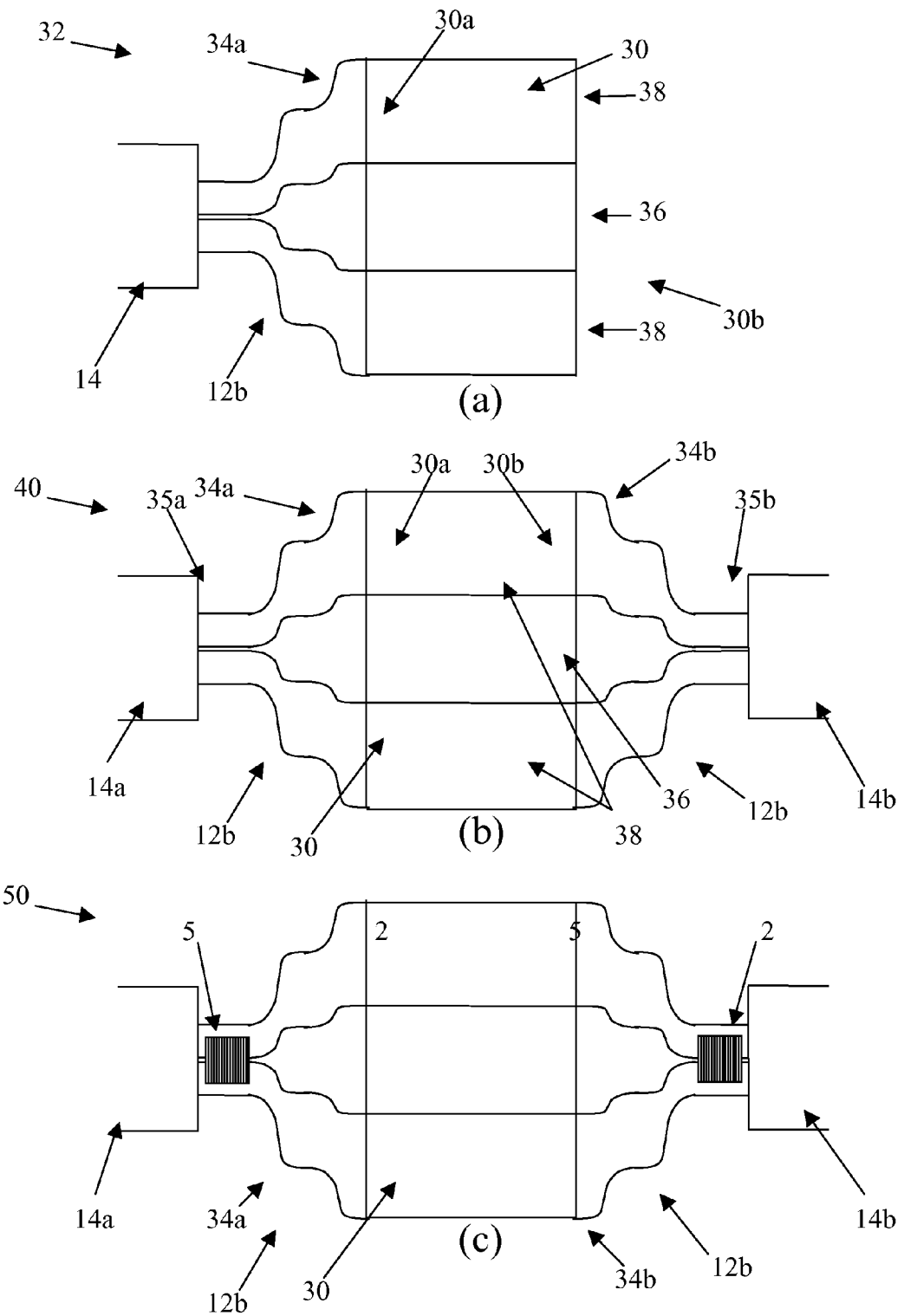
FIG. 4 shows a series of optical devices that can be manufactured using the up-tapered fiber of FIG. 3.

Taking the multi-stage fattened fiber 12b shown in FIG. 3, the fiber 12b is first cleaved across line C-C, i.e. across the widest cross-section of the fiber 12b. Once a cleaved multi-stage fattened fiber 12b is provided, the fiber may be combined with a suitable section of a doped fiber in different manufacturing processes to produce improved optical devices employing multi-stage fattened fibers. Examples of such optical devices can be seen in FIGS. 4(a)-(c).

As the section of the doped fiber (indicated at 30 in FIG. 4) is of a greater diameter than that of the original un-fattened optical fiber 12, the mode-profile is flatter than for an un-fattened fiber with a Gaussian shape mode. A more efficient and more even interaction with the dopants in the fattened optical fiber 30 can therefore be provided in the fiber 30 than for the same length of the original, unfattened fiber 12 that results in a flatter gain response.

Furthermore, the use of particular glass fibers, e.g. a phosphate glass fiber, can allow for a much higher concentration of dopant than, for example, silica glass fiber. Therefore, by selecting a first glass fiber appropriate for the multi-stage fattening (e.g. silica), and splicing the fattened fiber with a glass fiber suitable for high-concentration doping (e.g. phosphate), then an optical device can be manufactured having improved amplification for a relatively small footprint of device.

It will be understood that, while the devices described employ phosphate glass fibers, other types of glass fibers may be used, e.g. phosphate, silica, telluride, fluoride, chalcogenide, bismuth. Similarly, while the examples utilise erbium as the dopant, the fiber section may be doped with any one of the following dopants: erbium, thulium, chromium, ytterbium, praseodymium, neodymium, terbium or a combination thereof.

With reference to FIG. 4(a), an optical wavelength converter is indicated generally at 32. The converter 32 comprises a cleaved end 34a of the fattened fiber 12b coupled with the first end 30a of a length of fiber 30 having an erbium-doped phosphate core 36 with a suitable cladding 38. The fiber 30 has a diameter substantially equal to the diameter of the cleaved end 34a of the fiber 12b. The uncleaved, unfattened end of the fiber 12b is coupled with an optical buffer 14, such that the buffer 14 and the fiber 12b together form a fattened fiber input launch for the optical wavelength converter 32. The free second end 30b of the fiber section 30 can be used to provide a wavelength-converted output for a signal input at the optical buffer 14. Such a converter 32 can be used for to provide wavelength conversion having high gain for various purposes, for example, to convert infrared light to visible light for the purposes of charge-coupled device (CCD) detection.

With reference to FIG. 4(b), an optical fiber amplifier is indicated generally at 40. The amplifier 40 comprises a first cleaved end 34a of the fattened fiber 12b coupled with the first end 30a of a length of fiber 30 having an erbium-doped phosphate core 36 with a suitable cladding 38. The second end 30b of the fiber 30 is coupled with a second cleaved end 34b of the fattened fiber 12b.

The respective first and second uncleaved, unfattened ends of the fiber 12b are indicated at 35a,35b in FIG. 4(b). The first cleaved and uncleaved ends 34a,35a of the fiber 12b form a fattened fiber input signal lead and forward pump launch for the optical amplifier 40. Similarly, the second cleaved and uncleaved ends 34b,35b form a fattened fiber output signal lead and reverse pump launch for the optical amplifier 40. The optical amplifier 40 shown is suitable for use in systems to amplify optical signals as they propagate along relatively long fibers, e.g. for regeneration purposes.

With reference to FIG. 4(c), an optical fiber laser is indicated generally at 50. The laser 50 may be constructed in a similar fashion to the optical amplifier 40 described above, with the distinction that, prior to the coupling of the cleaved ends 34a,34b of the fattened fiber 12b with the fiber section 30, the cleaved ends 34a,34b are processed to provide partial end-reflections at the cleaved ends 34a,34b. For lasing to occur in a fiber, a resonant gain cavity is required in the fiber. In general, some form of reflectors are provided at either ends of the resonant gain cavity, the cavity then being excited by a pump source. Resonance is achieved in the cavity by using reflectors operable to reflect light at the lasing wavelength within the cavity. In a fiber system, the end reflectors are typically fiber Bragg gratings—the most convenient and effective and preferred method. However, further types of reflecting means may be employed, for example, it would be possible to "drill" into the fiber either side of the lasing cavity and deposit silver/gold to achieve end reflection. In FIG. 4(c), the reflectors are provided in the form of fiber gratings 52. The gratings 52 provide for the partial reflection of light of a particular wavelength along the fiber section 30. This further processing stage may involve any suitable grating manufacturing process, e.g. inscribing a grating pattern on the fiber, photo-inducing a grating pattern, etc.

The invention is not limited to the embodiments described herein but can be amended or modified without departing from the scope of the present invention.

The invention claimed is:

1. A fiber dilation method for providing a multi-stage dilated optical fiber, the method comprising the steps of:
    performing a first-stage fiber dilation process on an optical fiber to form a first dilated section of the optical fiber; and
    performing a second-stage fiber dilation process on said first dilated section of the optical fiber to form a second dilated section of the optical fiber, wherein said second dilated section is arranged such that the transition in diameter formed between said first dilated section and said second dilated section is spaced from the transition in diameter formed between the undilated section of the optical fiber and said first dilated section
    wherein said dilation processes comprise:
    applying a heat source along a portion of the length of an optical fiber to soften said portion of the optical fiber; and
    applying a compressive force to said portion of the optical fiber to dilate said portion.

2. The method of claim 1, wherein the method further comprises the steps of iteratively performing at least one successive fiber dilation process on the dilated section of a preceding stage, wherein the transition formed by said at least one successive fiber dilation process is spaced from the transition formed by the preceding stage.

3. The method of claim 1, wherein the spacing is chosen such that, at any point along the multi-stage dilated optical fiber, the angle of dilation satisfies the following criterion:

$$\left|\frac{da}{dz}\right| \ll \frac{a}{z_b}$$

wherein da/dz defines the tapered angle of dilation, a is the local core radius of the fiber, and $z_b$ is the beat length between the $HE_{11}$ and $HE_{12}$ modes.

4. The method of claim 1, wherein said first-stage fiber dilation process comprises dilating a section of said optical fiber to approximately 2-3 times the diameter of said optical fiber.

5. The method of claim 4, wherein said first-stage fiber dilation process comprises dilating a section of said optical fiber to approximately 2.25 times the diameter of said optical fiber.

6. The method of claim 1, wherein said second-stage fiber dilation process comprises dilating said first dilated section of the optical fiber to approximately 4-5 times the diameter of said optical fiber.

7. The method of claim 4, wherein said second-stage dilation process comprises dilating said first dilated section of the optical fiber to approximately 4.5 times the diameter of said optical fiber.

8. A method for coupling standard optical fibers and large mode area fibers, the method comprising the steps of:
    manufacturing a multi-stage dilated optical fiber according to the method of claim 1;
    cleaving said multi-stage dilated optical fiber to provide a first cleaved end of a multi-stage dilated optical fiber;
    providing a large mode area optical fiber having a first end and a second end; and
    coupling the core of said cleaved end of a multi-stage dilated optical fiber with the first end of the core of said large mode area optical fiber.

9. A method of manufacture of an optical wavelength converter, the method comprising the steps of:
    manufacturing a multi-stage dilated optical fiber according to the method of claim 1;
    cleaving said multi-stage dilated optical fiber to provide a first cleaved end of a multi-stage dilated optical fiber;
    providing a large mode area doped optical fiber having a first end and a second end;
    coupling the core of said cleaved end of a multi-stage dilated optical fiber with the first end of the core of said large mode area doped optical fiber, such that said cleaved end of a multi-stage dilated optical fiber and said large mode area doped optical fiber form an optical wavelength converter operable to convert optical signals of a first wavelength received at the uncleaved, undilated end of said multi-stage dilated optical fiber to optical signals of a second wavelength at said second end of said large mode area doped optical fiber.

10. A method of manufacture of an optical fiber amplifier, the method comprising the steps of:
    manufacturing a multi-stage dilated optical fiber according to the method of claim 1;
    cleaving said multi-stage dilated optical fiber to provide a first and a second section of a multi-stage dilated optical fiber having respective first and second cleaved ends and uncleaved ends;
    providing a large mode area doped optical fiber having a first end and a second end;
    coupling the core of said first and second cleaved ends of said multi-stage dilated optical fiber sections with the core of the respective first and second ends of said large mode area doped optical fiber; and
    coupling the first and second uncleaved ends of said multi-stage dilated optical fiber section to form an optical fiber amplifier, the amplifier operable to amplify an optical signal transmitted between said first and second uncleaved ends through said multi-stage dilated optical fiber sections and said large mode area doped optical fiber.

11. A method of manufacture of an optical fiber laser, the method comprising the steps of:
- manufacturing a multi-stage dilated optical fiber according to the method of claim 1;
- cleaving said multi-stage dilated optical fiber to provide a first and a second section of a multi-stage dilated optical fiber having respective first and second cleaved ends and uncleaved ends;
- processing said first and second cleaved ends to provide reflecting means at said cleaved ends;
- providing a large mode area doped optical fiber having a first end and a second end;
- coupling the core of said first and second cleaved ends of said multi-stage dilated optical fiber sections with the core of the respective first and second ends of said large mode area doped optical fiber such that a resonant lasing cavity is provided between said first and second cleaved ends to form an optical fiber laser.

12. The method of claim 11, wherein said step of processing comprises one of: inscribing a grating pattern on said at least one cleaved end; or photo-inducing a grating pattern on said at least one cleaved end.

13. The method of claim 8, wherein said step of cleaving the multi-stage dilated optical fiber comprises cleaving the fiber across the widest cross-section of said fiber.

14. The method of claim 8, further comprising the step of selecting a large mode area doped optical fiber such that the mode diameter of the core of said large mode area doped optical fiber substantially corresponds to the mode diameter of the core of said cleaved end.

15. The method of claim 8, wherein the large mode area doped optical fiber is selected from one of the following types of glass: phosphate, silica, telluride, fluoride, chalcogenide, bismuth.

16. The method of claim 8, wherein the large mode area doped optical fiber is doped with a rare-earth material.

17. The method of claim 16, wherein the large mode area doped optical fiber is doped with one of the following dopants: erbium, thulium, chromium, ytterbium, neodymium, praseodymium, terbium or a combination thereof.

18. An optical wavelength converter manufactured according to the method of claim 9.

19. An optical fiber amplifier manufactured according to the method of claim 10.

20. An optical fiber laser manufactured according to the method of claim 12.

21. A fiber comprising a portion of standard optical fiber and a portion of large mode area optical fiber coupled according to the method of claim 8.

22. A multi-stage dilated optical fiber manufactured according to the method of claim 1.

* * * * *